US006391474B1

(12) United States Patent
Rückert et al.

(10) Patent No.: US 6,391,474 B1
(45) Date of Patent: May 21, 2002

(54) CYLINDER LINER

(75) Inventors: Franz Rückert, Ostfildern; Peter Stocker, Sulzbach, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/647,686

(22) Filed: Sep. 29, 2000

(30) Foreign Application Priority Data

Apr. 1, 1998 (DE) ........................................ 198 14 570

(51) Int. Cl.[7] ............................ B32B 15/20; F02F 1/00

(52) U.S. Cl. .................... 428/650; 123/193.1; 277/592; 277/936; 277/940; 277/941; 428/652; 428/653; 428/925; 428/926

(58) Field of Search ................................ 428/650, 652, 428/653, 925, 926; 123/193.1; 277/592, 936, 940, 941

(56) References Cited

U.S. PATENT DOCUMENTS

| | | | | |
|---|---|---|---|---|
| 5,860,469 A | * | 1/1999 | Barlow | 123/193.1 |
| 6,221,504 B1 | * | 4/2001 | Pfeffinger et al. | 428/650 |

FOREIGN PATENT DOCUMENTS

| | | |
|---|---|---|
| DE | 35 39 674 | 7/1986 |
| DE | 195 23 484 A1 | 6/1995 |
| DE | 196 34 504 | 12/1997 |
| EP | 0 851 109 A1 | 12/1997 |
| JP | 59-003142 | 1/1984 |

* cited by examiner

*Primary Examiner*—Robert R. Koehler
(74) *Attorney, Agent, or Firm*—Kenyon & Kenyon

(57) ABSTRACT

The invention relates to a cylinder liner made from a hypereutectic aluminum/silicon alloy which is surrounded by a surround casting material, which is characterized in that the minimum ratio of the wall thickness of the surround casting material of the cylinder liner is 1.4.

2 Claims, No Drawings

CYLINDER LINER

FIELD OF INVENTION

The invention relates to a cylinder liner made from a hypereutectic aluminium/silicon alloy which is surrounded by a surround casting material.

BACKGROUND

German laid-open specification DE 195 23 484 A1 has disclosed a cylinder liner which is cast into a reciprocating engine. In the context of the present invention, the material enclosing the cylinder liner is referred to as a surround casting material.

To keep the materials costs and the weight of the engine low, for reasons of achieving the minimum possible cylinder spacing and a short crankcase, it is desirable for both the wall thickness of the cylinder liner and the wall thickness of the surround casting material to be as small as possible. Since production involving the surround-casting of a separate liner comprising the base material of the crankcase increases the total wall thickness of the cylinder compared to a single-material casting, the problem of achieving a short cylinder spacing is particularly acute in this case. The special material of the cylinder liner which is to be cast in is more expensive than the base material of the crankcase. On the other hand, the cylinder liner which is to be cast in cannot be as thin as desired, so that the material forming this liner does not lose its specific microstructure when the liner is surrounded by casting.

DE 35 39 674 C2 has disclosed a twin cylinder block made from an aluminium alloy with a cast-in liner. The thickness of the cylinder is 50% or more of the minimum thickness of the cylinder liners.

DE 196 34 504 A1has disclosed a blank for a cylinder liner made from a hypereutectic aluminium/silicon alloy and a process for its production. By means of a special surface treatment, the intention is to achieve an improved material-to-material bond between the liner and a crankcase. The intention is to make it possible to achieve thinner wall thicknesses for the cast-in component.

SUMMARY

The object of the invention is to specify an optimum ratio between the wall thickness of the surround casting material and the wall thickness of the cylinder liner.

Initially, cylinder liners of the same wall thickness as the surround casting material were used. To save on materials costs, tests were carried out to investigate the extent to which the wall thickness of the cylinder liner can be reduced in relation to the surround casting material. In the context of the present invention, it was discovered that the use of cylinder liners with a lower wall thickness than that of the surround casting material leads to improved metallic bonding in the cylinder liner/surround casting interface area. At a predetermined wall thickness of the surround casting material, the wall thickness of the cylinder liner can be reduced. In this way, it is possible to achieve reduced cylinder spacings. The volume and weight of the engine are advantageously reduced.

A particular embodiment of the invention is characterized in that the basic wall thickness of the cylinder liner in an engine with a surround-cast wall thickness of from 3.5 to 4.5 mm is 2.5 to 3.0 mm. Reducing the wall thickness of the cylinder liner leads to considerable cost savings.

Further advantages, features and details of the invention will emerge from the following description, in which an exemplary embodiment of the invention is described in detail.

DESCRIPTION OF EMBODIMENTS

For example, if the surround casting material has a wall thickness of from 3.5 to 4.5 mm, in an engine of this type initially cylinder liners with a basic wall thickness of 4.5 mm were used. In the context of the present invention, it has emerged that the basic wall thickness of the cylinder liners which are surrounded by the surround casting material can be reduced to from 2.5 to 3 mm.

Depending on the engine type and engine size, the wall thickness of the surround casting material may be between 3 mm and 8 mm. For diesel engines with a light metal crankcase, a surround-casting wall thickness of 8 mm is realistic.

In the context of the present invention, it has emerged that the metallic bonding between the cylinder liner and the surround casting material is improved if the ratio between the wall thickness of the surround casting material and of the cylinder liner is increased. With a surround casting/liner wall thickness ratio of 1, bonding of 20 to 30% was established. For a surround casting/liner wall thickness ratio of 1.8, it was possible to establish an improved bonding of from 40 to 50%.

Although the invention has been described in detail with reference to certain preferred embodiments and specific examples, variations and modification exist within the scope and spirit of the invention as described and as defined in the following claims.

What is claimed is:

1. Cylinder liner comprising: a hypereutectic aluminum/silicon alloy which is surrounded by a surround casting material, wherein the minimum ratio between the wall thickness of the surround casting material and of the cylinder liner is 1.4.

2. The cylinder liner of claim 1, wherein the basic wall thickness of the cylinder liner in an engine with a surround-cast wall thickness of from 3.5 to 4.5 mm is 2.5 to 3.0 mm.

* * * * *